United States Patent
Inoue

(10) Patent No.: US 6,252,858 B1
(45) Date of Patent: Jun. 26, 2001

(54) METHOD AND APPARATUS FOR BUILDING NETWORK CONFIGURATION DATABASE

(75) Inventor: Yoshitsugi Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/157,006

(22) Filed: Sep. 18, 1998

(30) Foreign Application Priority Data

Mar. 16, 1998 (JP) .................................................. 10-065179

(51) Int. Cl.$^7$ .................................................. H04L 12/28

(52) U.S. Cl. .......................................... 370/254; 370/400

(58) Field of Search .................................... 370/221, 226, 370/217, 225, 255, 228, 254, 400, 409, 395, 392, 241, 242; 709/220, 221, 222

(56) References Cited

U.S. PATENT DOCUMENTS

| | | | |
|---|---|---|---|
| 5,483,631 | * | 1/1996 | Nagai et al. ......................... 395/155 |
| 5,724,341 | * | 3/1998 | Inoue .................................. 370/221 |

FOREIGN PATENT DOCUMENTS

| | | |
|---|---|---|
| 5-83226 | 4/1993 | (JP) . |
| 5-128032 | 5/1993 | (JP) . |
| 5-250296 | 9/1993 | (JP) . |

* cited by examiner

Primary Examiner—Chau Nguyen
Assistant Examiner—Alexander Boakye
(74) Attorney, Agent, or Firm—Helfgott & Karas, P.C.

(57) ABSTRACT

A method and apparatus for building network configuration database, which eliminates manual data collection and verification tasks and thereby reduces the time and labor costs related to such tasks. A device data collection unit requests a plurality of transmission units on the network to report how they are configured. This request may be initiated at regular intervals or triggered by an external source on demand. Template data is previously prepared by modeling possible configurations of various types of transmission units, and stored in a template data storage unit. A data area management unit reserves a plurality of data storage areas in the physical connection database, according to the template data in the template data storage unit. A process decision unit stores the device configuration data collected by the device data collection unit into corresponding data storage areas reserved in the physical connection database.

24 Claims, 14 Drawing Sheets

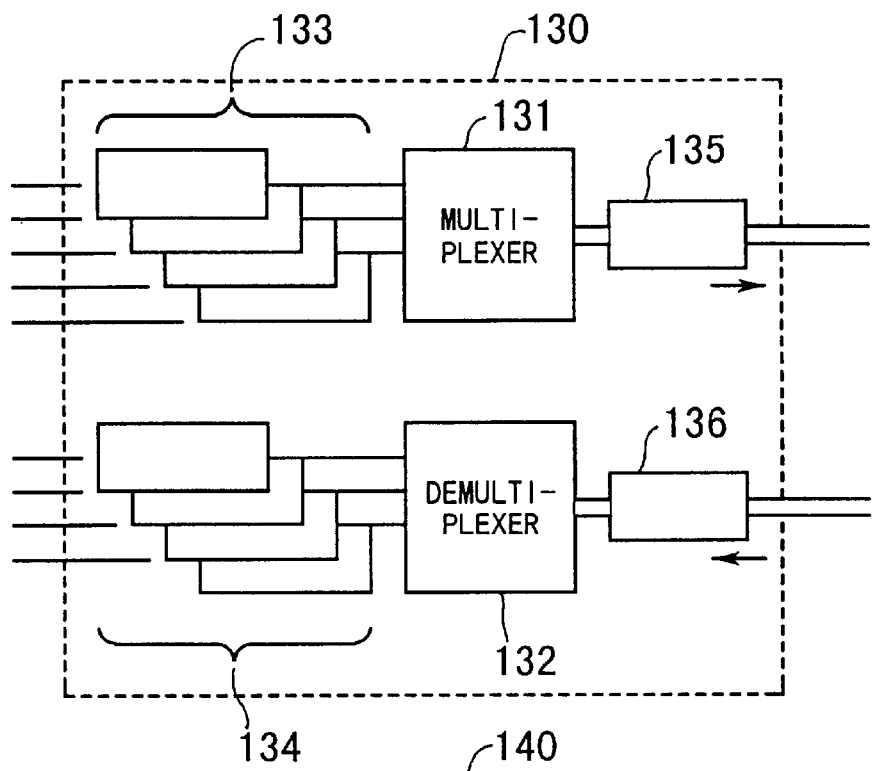
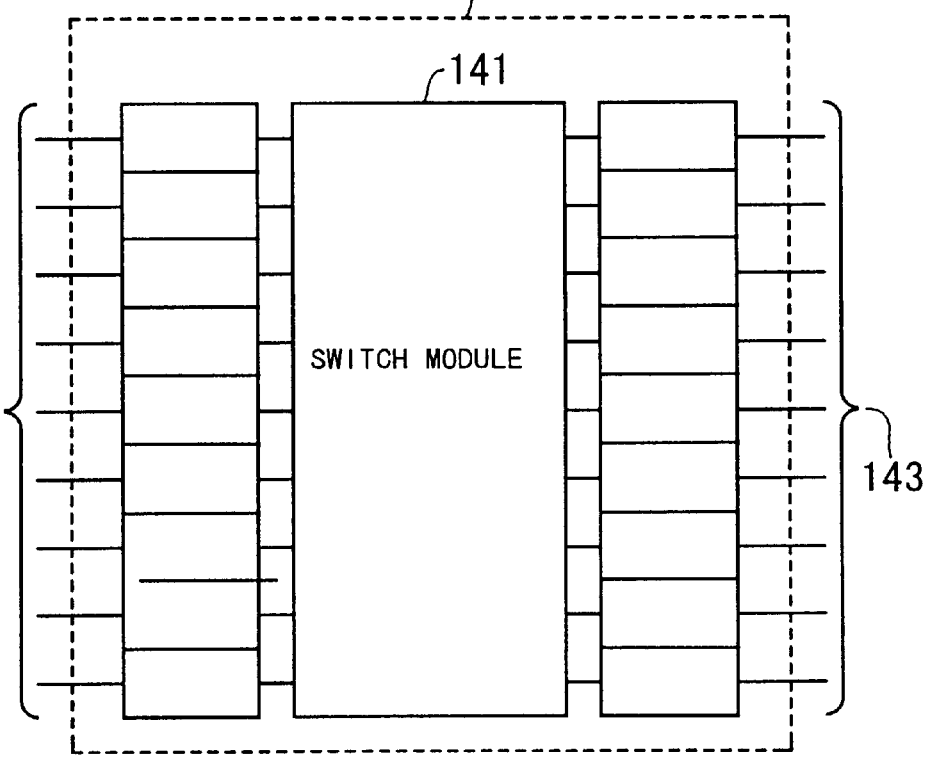
FIG. 4

FIG. 12 (A)

| LEVEL | RE-DUN-DANCY | REMOTE INTERFACE LOCATION DATA | LOCAL INTERFACE LOCATION DATA |
|---|---|---|---|
| U | 0 | | |
| | 1 | | |
| D1 | 0 | | |
| | 1 | | |
| D2 | 0 | | |
| | 1 | | |
| D3 | 0 | | |
| | 1 | | |
| D4 | 0 | | |
| | 1 | | |

FIG. 12 (B)

| LEVEL | RE-DUN-DANCY | REMOTE INTERFACE LOCATION DATA | LOCAL INTERFACE LOCATION DATA |
|---|---|---|---|
| U | 0 | | |
| | 1 | | |
| D1 | 0 | | |
| D2 | 0 | | |
| D3 | 0 | | |
| D4 | 0 | | |
| D5 | 0 | | |
| D6 | 0 | | |
| D7 | 0 | | |
| ST | 1 | | |

| LEVEL | RE-DUN-DANCY | REMOTE INTERFACE LOCATION DATA | LOCAL INTERFACE LOCATION DATA | TSW | SSW |
|---|---|---|---|---|---|
| — | | | | | |
| — | | | | | |

FIG. 13

METHOD AND APPARATUS FOR BUILDING NETWORK CONFIGURATION DATABASE

BACKGROUND OF THE INVENTION

1. Field of the Invention

The present invention relates to a method and apparatus for building a network configuration database. More particularly, the present invention relates to a network configuration database builder which is connected to a plurality of transmission units constituting a network, and also to a method executed by this database builder to create a network configuration database.

2. Description of the Related Art

Configuration management, which is one of the major aspects of network management, can be defined as a process of collecting data from a network of interest and using that data to manage the configuration of all network devices being involved. The collected data is stored into an appropriate database, allowing efficient access from network engineers. Conventionally, such a network configuration database is constructed through a labor-intensive process which includes the following tasks: (1) manually designing database records, based on the connections among transmission units that constitute the network, (2) verifying the records concerning their contents and coverage, (3) correcting errors, and (4) registering the validated records into the network configuration database.

In reality, however, the network configuration changes almost every day, and transmission units on the network are routinely added, deleted, and/or reconfigured. On the other hand, the network engineers always need precise information about network configuration to accomplish their duty, which includes the setup of new communication channels, diagnosis of existing channels, and troubleshooting. Thus the network configuration database is required to be perfectly consistent with the physical configuration of the network, and it is necessary for the network engineers to frequently refresh the database to keep up-to-date information. However, since the maintenance of this database is a labor-intensive job, there has been a demand for such a facility that aids the network engineers and reduces the cost of labor.

In the conventional process of building a network configuration database described above, the initial design stage is prone to introduce human errors. This is why the conventional process involves verification of records as an essential step. The problem is that this verification step should be performed each time the network configuration is changed. Time and expenses for such verification tasks have been a major concern in the network configuration management.

Further, the verification of database records is not a simple and easy task, but requires expert knowledge about network design and transmission equipment. This is another factor to increase the time and expenses for the network configuration management.

SUMMARY OF THE INVENTION

Taking the above into consideration, an object of the present invention is to provide a method and apparatus for building a network configuration database which eliminates manual data collection and verification processes and thereby reduces the time and labor costs associated with them.

To accomplish the above object, according to the present invention, there is provided an apparatus for building a network configuration database, which is connected to a plurality of transmission units constituting a network. This apparatus comprises the following elements:

(a) a device data collection unit which collects device configuration data from the plurality of transmission units, where the device configuration data describes how each transmission unit is internally configured and how each transmission unit is linked to other transmission units;

(b) a template data storage unit which stores template data that is previously prepared by modeling possible configurations of various types of transmission units;

(c) a physical connection database which stores the device configuration data;

(d) a data area management unit which reserves a plurality of data storage areas in the physical connection database according to the template data stored in the template data storage unit, where the plurality of data storage areas are allocated respectively to the plurality of transmission units; and (e) a process decision unit which saves the device configuration data collected by the device data collection unit into the corresponding data storage areas in the physical connection database.

To accomplish the above object, according to the present invention, there is provided a method of building a network configuration database, which is executed by a network configuration database builder that is connected to a plurality of transmission units constituting a network and comprises a physical connection database to store device configuration data. This method comprising the steps of:

(a) storing template data that is previously prepared by modeling possible configurations of various types of transmission units;

(b) reserving a plurality of data storage areas in the physical connection database according to the template data stored in the step (a);

(c) collecting device configuration data from the plurality of transmission units, which describes how each transmission unit is internally configured and how each transmission unit is linked to other transmission units; and (d) storing the device configuration data collected in the step (c) into the corresponding data storage areas reserved in the physical connection database.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4(A) is a diagram which shows the internal structure of a multiplexer/demultiplexer device;

FIG. 4(B) is a diagram which shows the internal structure of a path/channel rearrangement device;

FIG. 12(A) is a diagram which shows a first internal structure of a "Configuration Data Table" when the device of interest falls under a category of multiplexer/demultiplexer devices;

FIG. 12(B) is a diagram which shows a second internal structure of the Configuration Data Table when the device of interest falls under a category of multiplexer/demultiplexer devices;

FIG. 13 is a diagram which shows an exemplary internal structure of the Configuration Data Table when the device of interest falls under a category of path/channel rearrangement devices;

DESCRIPTION OF THE PREFERRED EMBODIMENTS

An embodiment of the present invention will be described below with reference to the accompanying drawings.

Figure 1:
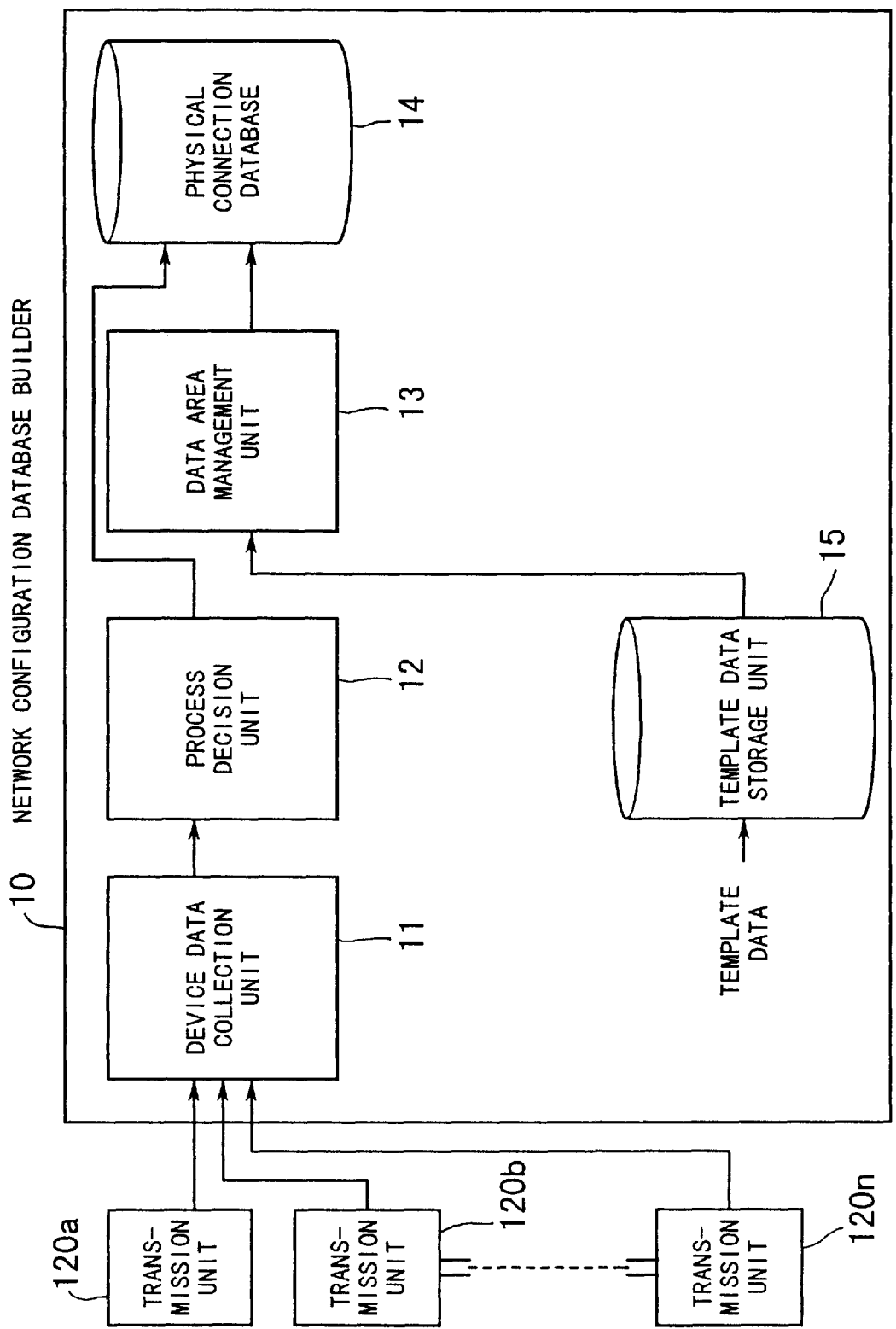
FIG. 1 is a conceptual view of the present invention.

Referring first to FIG. 1, the following section will describe the concept of a network configuration database builder 10 according to the present invention. This embodiment of the present invention comprises the following elements:

(a) a device data collection unit 11 which collects device configuration data from a plurality of transmission units 120a to 120n, where the device configuration data describes how each transmission unit is internally configured and how each transmission unit is linked to other transmission units;

(b) a template data storage unit 15 which stores template data that is previously prepared by modeling possible configurations of various types of transmission units;

(c) a physical connection database 14 which stores the device configuration data;

(d) a data area management unit 13 which reserves a plurality of data storage areas in the physical connection database 14 according to the template data stored in the template data storage unit 15, where the plurality of data storage areas are allocated respectively to the plurality of transmission units 120a to 120n; and (e) a process decision unit 12 which saves the device configuration data collected by the device data collection unit 11 into the corresponding data storage areas in the physical connection database 14.

In operation of the above database builder 10, the device data collection unit 11 requests the transmission units 120a to 120n to report how they are configured at present. This request may be initiated at regular intervals or triggered by an external source on an on-demand basis. The transmission units 120a to 120n on the network are designed to respond to this request by sending their own device configuration data back to the device data collection unit 11. The device configuration data describes the internal arrangement of each transmission unit, as well as showing how it is linked to other transmission units. Here, the term "transmission unit" refers to a variety of devices that can serve as network nodes, such as multiplexer/demultiplexer devices and path/channel rearrangement devices.

Typical patterns or models of possible device configurations for various device types are previously prepared and stored in the template data storage unit 15. This information is called "template data," whose content depends on the types of transmission units to be modeled. More specifically, the template data for multiplexer/demultiplexer devices reserves data fields to describe how its local interface modules are linked to those of remote network devices. Regarding path/channel rearrangement devices, their template data defines data fields to describe the connection between terminals of switch modules in a predetermined order, in addition to describing how their local interface modules are linked to those of remote network devices.

According to the template data stored in the template data storage unit 15, the data area management unit 13 sets up appropriate data storage areas within the physical connection database 14, taking into consideration the maximum number of interface modules and signal terminals of a switch module that one transmission unit can accommodate. Each data storage area is fixed in size, but it is large enough to cope with every possible change in the types and combinations of interface and switch modules.

The process decision unit 12 receives the collected device configuration data from the device data collection unit 11 and saves it, as database records, into a relevant part of the data storage areas reserved in the physical connection database 14. In this way, the network configuration database builder 10 of the present invention automatically collects device configuration data from network devices, produces database records, and saves them into the physical connection database 14. It should be noted that the template functions makes it possible to automatically build a network configuration database, reflecting possible variations in the configuration of interface modules installed in a transmission unit. These features of the present invention relieve the network engineers of an enormous amount of work to build a network configuration database. This prevents human errors from being introduced during the process, thus eliminating the time and labor costs related to the manual data collection and verification tasks.

The embodiment of the present invention outlined above will now be described in detail below. Note that the network configuration database builder 10 of FIG. 1 is redrawn as a detailed block diagram of FIG. 8, where like elements have like reference numerals, but with a suffix "a" (e.g., the device data collection unit 11 appears in FIG. 8 as a device data collection unit 11a).

Figure 2:
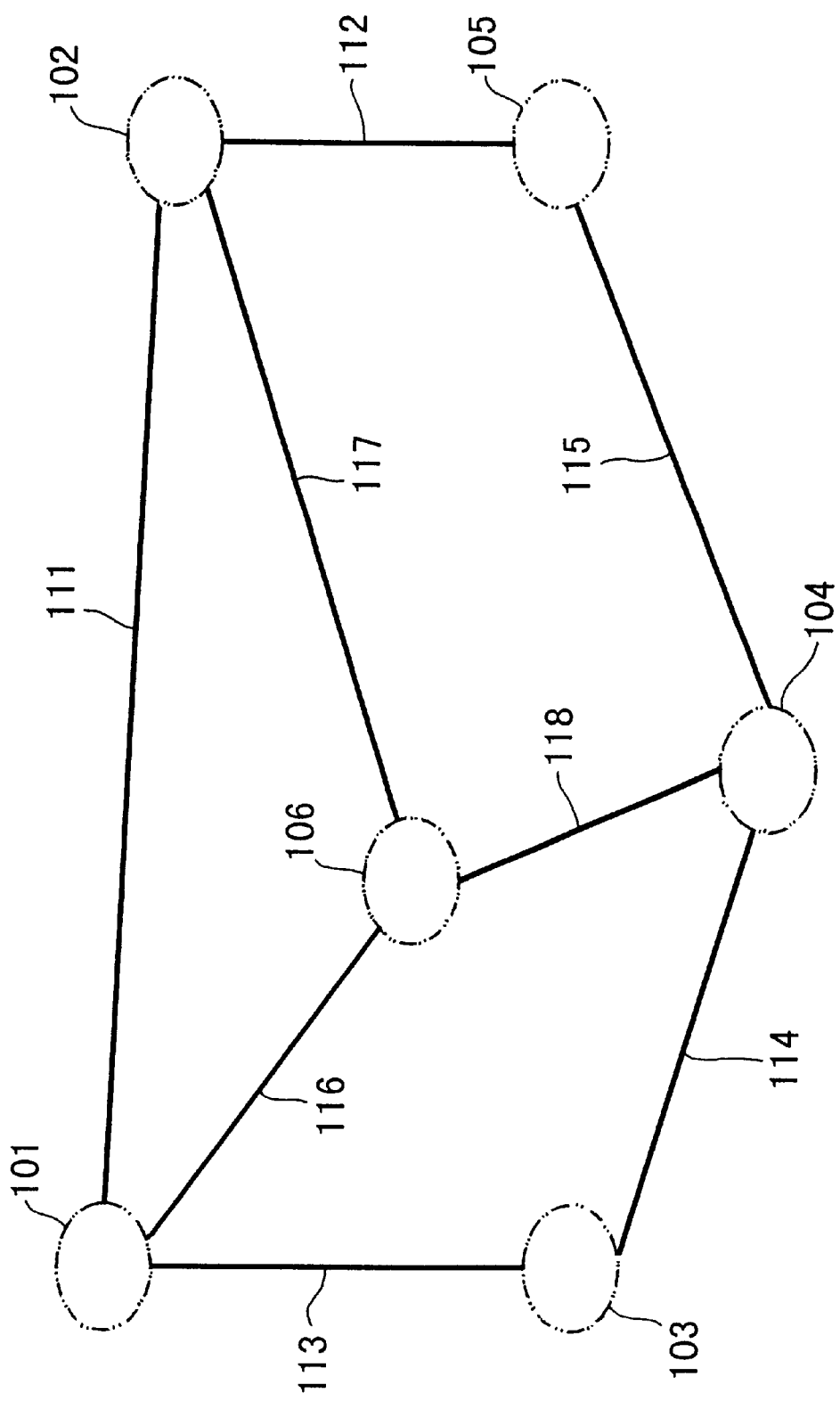
FIG. 2 is a diagram which shows the structure of a network where a network configuration database builder of the present invention is deployed.

FIG. 2 illustrates a network where the network configuration database builder 10 of the present invention will be deployed. This network is organized by a plurality of network nodes 101 to 106 and links (or transmission lines) 111 to 118 interconnecting the nodes. Each of the network nodes 101 to 106 comprises a plurality of transmission units.

Figure 3:
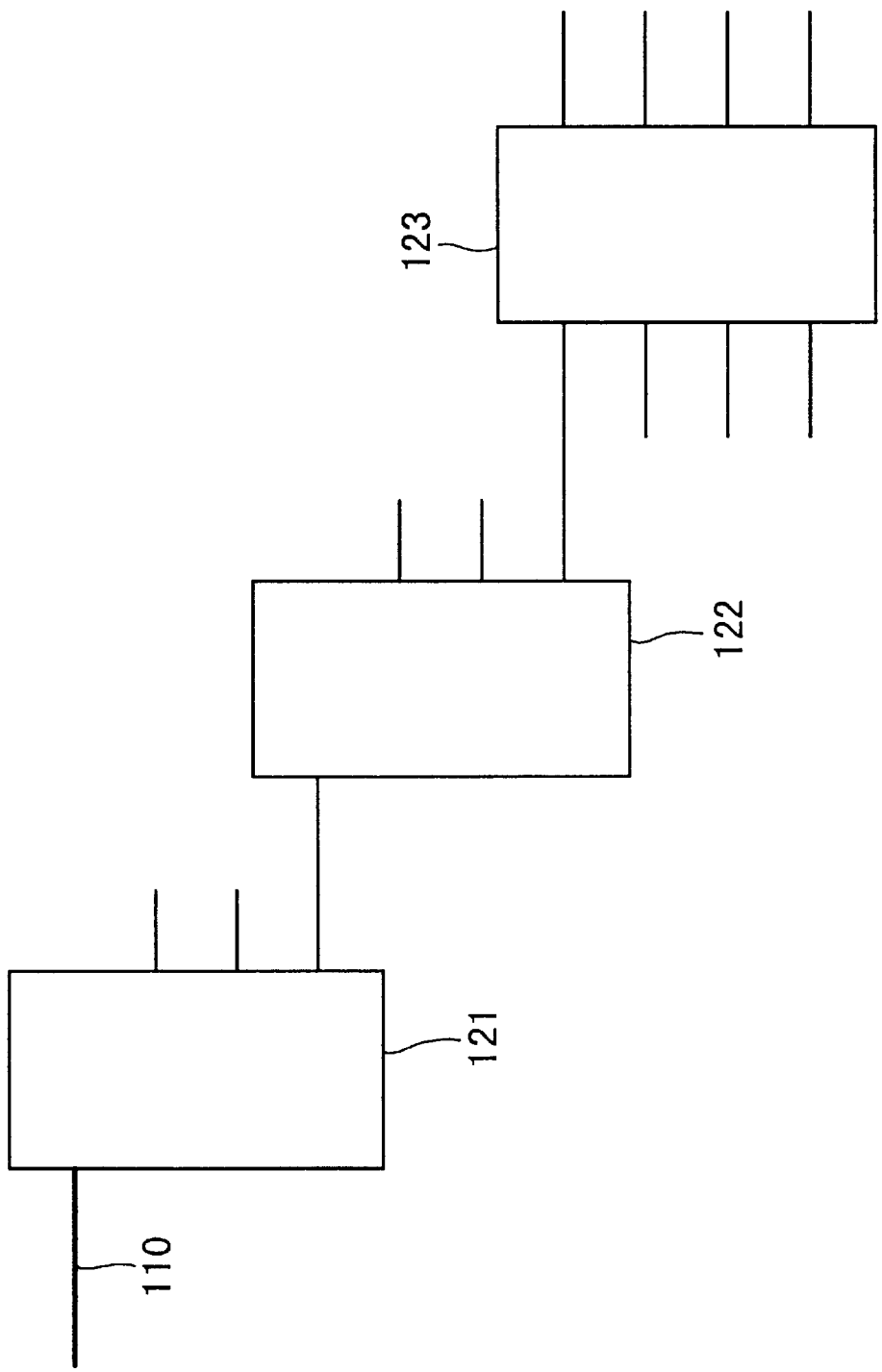
FIG. 3 is a diagram which illustrates the internal structure of a network node.

FIG. 3 shows the internal structure of one of those nodes 101 to 106, in which three transmission units 121, 122, and 123 are connected in series. The transmission unit 121 is a multiplexer/demultiplexer device, whose high-level interface (i.e., high-speed signal interface) is connected to an external link 110 extending to another node. The next transmission unit 122 is also a multiplexer/demultiplexer device, whose high-level interface is connected to a low-level interface (i.e., low-speed signal interface) of the first transmission unit 121. Although the details are not shown in FIG. 3, the transmission unit 121 has more low-level interfaces to link with other transmission units (not illustrated).

The third transmission unit 123 is a path/channel rearrangement device, one interface of which is connected to a low-level interface of the second transmission unit 122. Similarly to the first transmission unit 121, the second transmission unit 122 has more low-level interfaces linking to other interfaces (not illustrated) of the transmission unit 123. Interfaces on the other side of the transmission unit 123 are used to link with subscriber terminals, or to extend to low-level interfaces of other multiplexer/demultiplexer devices (not illustrated).

FIGS. 4(A) and 4(B) present internal blocks of transmission units. More specifically, FIG. 4(A) shows a multiplexer/demultiplexer device 130, while FIG. 4(B) depicts a path/channel rearrangement device 140.

The multiplexer/demultiplexer device 130 of FIG. 4(A) has a plurality of interface modules 133 to receive low-speed digital signals. The received signals are directed to a multiplexer 131 to execute a time-division multiplexing process, and a high-level interface module 135 outputs the resultant high-speed digital signal. For example, the multiplexer/demultiplexer device 130 receives seven channels of 6-Mbps transmission signals and outputs a single 50-Mbps multiplexed signal to other equipment.

In contrast to the above, the lower half of FIG. 4(A) shows a demultiplexer portion of the multiplexer/demultiplexer device 130, where a high-speed digital signal is received by a high-level interface module 136 and split into a plurality of low-speed digital signals through a time-division demultiplexing process performed by a demultiplexer 132. Low-level interface modules 134 then output those demultiplexed signals to other equipment.

The path/channel rearrangement device 140 of FIG. 4(B) comprises a switch module 141 and interface modules 142 and 143. The switch module 141, having time switches and space switches as an integral part, provides two-way cross-connections of digital transmission signals. More specifically, it receives signals from the interface modules 142 and 143, rearranges the time slots within a channel or across different channels of the signals, and outputs the rearranged digital signals through the same interface modules 142 and 143.

Figure 5:
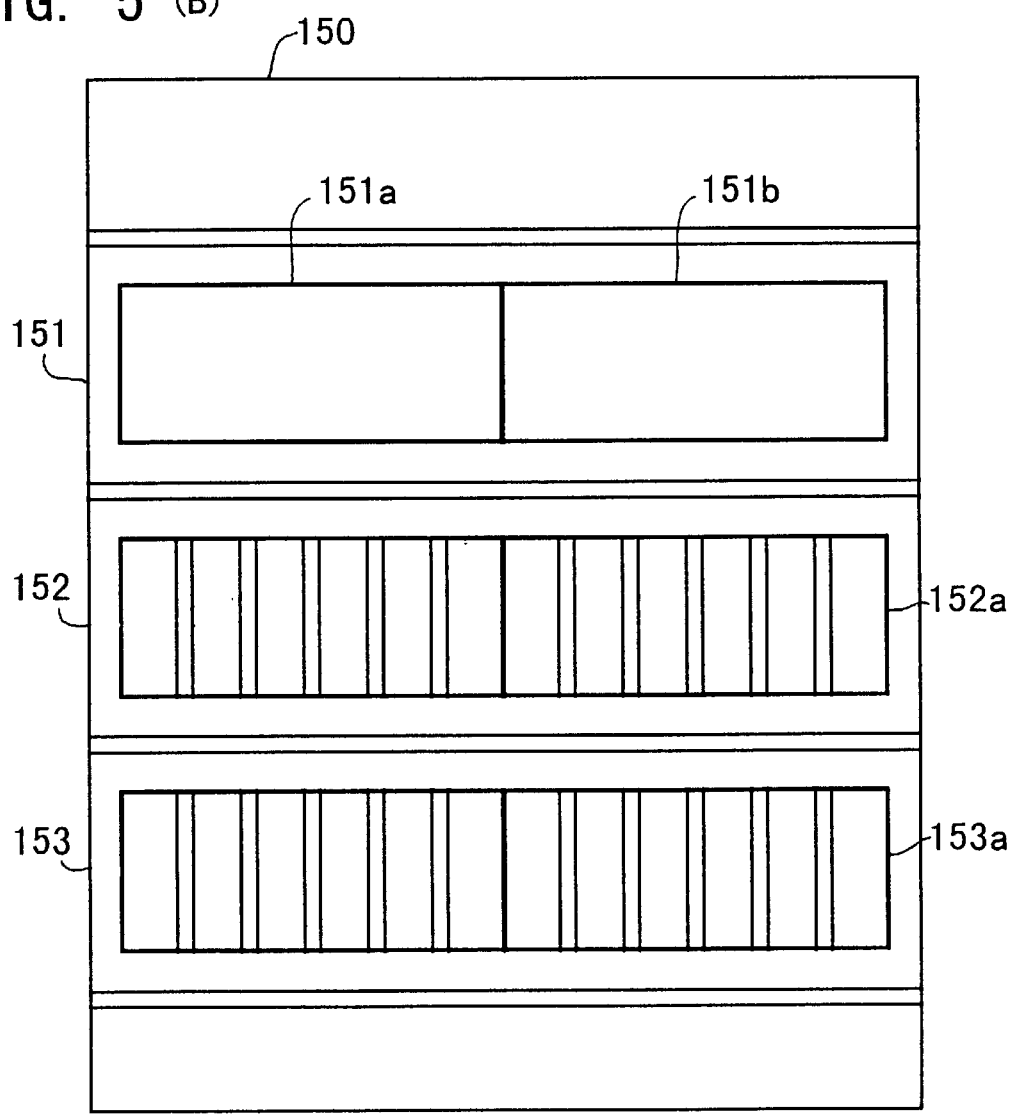
FIG. 5(A) is a diagram which illustrates an arrangement of transmission units constituting a network node.
FIG. 5(B) is a diagram which illustrates a typical module layout of one of the eight transmission units shown in FIG. 5(A)

FIG. 5(A) presents an exemplary arrangement of transmission units constituting a network node. This specific example shows that the node comprises eight transmission units, which can be classified into three groups. Here, the eight transmission units are identified by their unique unit identifiers (IDs) #01 to #08, while the three groups are called "Type-A," "Type-B," and "Type-C." That is, the node illustrated in FIG. 5(A) consists of the following units: a Type-A transmission unit #01, a Type-A transmission unit #02, a Type-B transmission unit #03, a Type-A transmission unit #04, a Type-A transmission unit #05, a Type-C transmission unit #06, a Type-C transmission unit #07, and a Type-C transmission unit #08.

FIG. 5(B) illustrates a typical internal layout of a transmission unit 150, which is one of the eight transmission units of FIG. 5(A). This transmission unit 150 comprises a plurality of racks 151 to 153, the usage of which is dependent of its unit type. More specifically, the rack 151 accommodates main system modules of the transmission unit 150, while the remaining racks 152 and 153 are used to install various interface modules. When this unit is the aforementioned multiplexer/demultiplexer device 130 of FIG. 4(A), the multiplexer 131 and demultiplexer 132 are the main system modules. Likewise, the switch module 141 is the main system module of the path/channel rearrangement device 140 of FIG. 4(B). The rack 151 has two system module slots 151a and 151b. The racks 152 and 153, on the other hand, have a plurality of interface module slots 152a and 153a, respectively.

Figure 6:
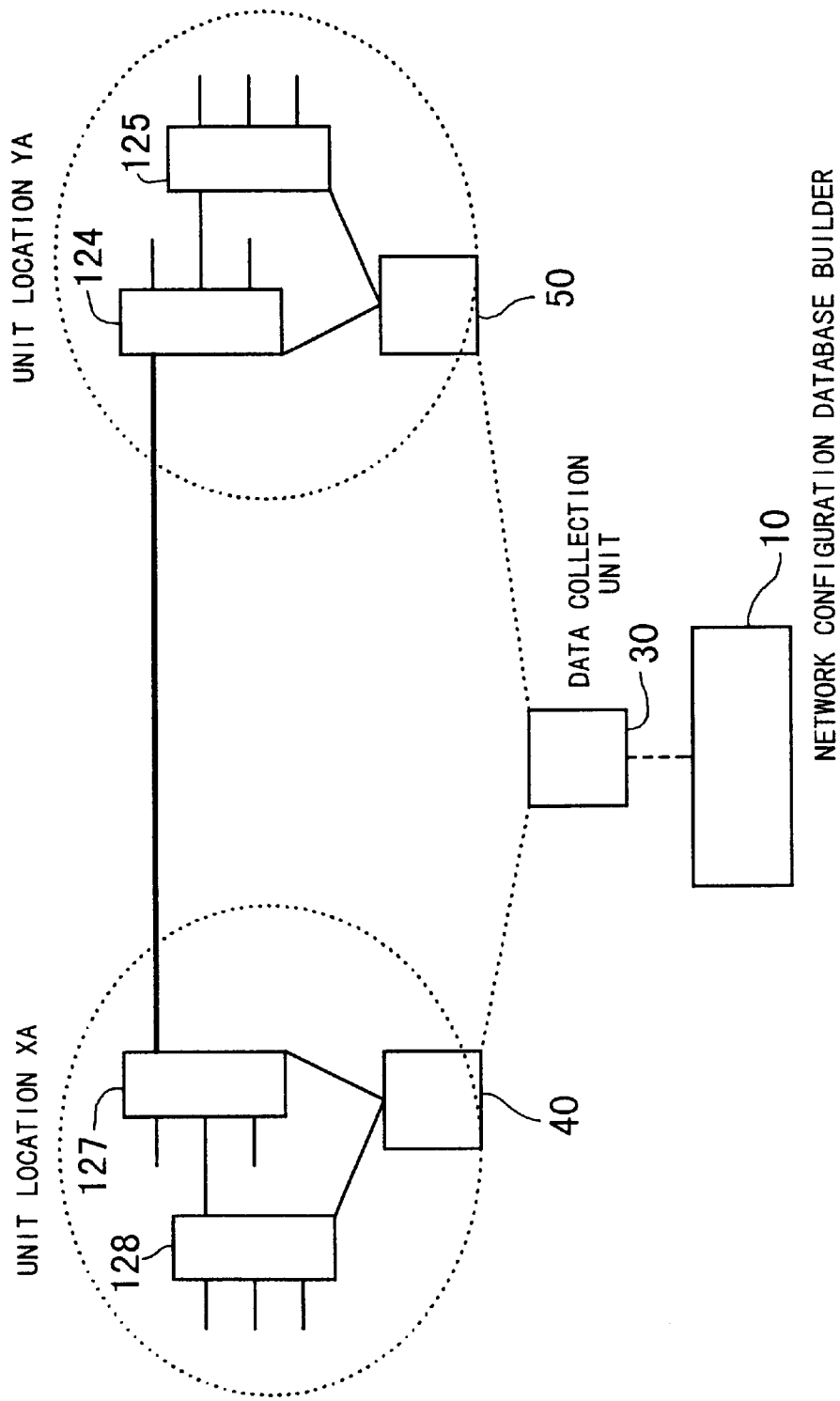
FIG. 6 is a diagram showing a network system to which a network configuration database builder is linked.

Referring now to FIG. 6, the next section will describe how the network configuration database builder 10 of the present invention is implemented in the above-described network and network devices.

FIG. 6 is a diagram showing a network system employing the network configuration database builder 10. For simplicity, FIG. 6 shows only two nodes on the network, which are identified by the names of their locations, XA and YA.

The node at the location YA comprises a plurality of transmission units 124 to 126. Although FIG. 6 shows only two transmission units 124 and 125, other units will appear in FIG. 7. Similarly, the node at the location XA comprises a plurality of transmission units 127 to 129. Although FIG. 6 shows only two transmission units 127 and 128, other units will appear in FIG. 7.

An adapter 50 is connected to the transmission units 124 to 126 at the location YA. On the other hand, another adapter 40 is coupled to the transmission units 127 to 129 at the location XA. Both adapters 40 and 50 are linked to a data collection unit 30, and this data collection unit 30 has a connection to the network configuration database builder 10 of the present invention. Via the data collection unit 30 and the adapters 40 and 50, the network configuration database builder 10 requests the transmission units 124 to 129 to send information on their respective device configurations. The response messages from the transmission units 124 to 129 arrive at the network configuration database builder 10 via the same route. The detailed data structure of this device configuration data will be described in the next section, with reference to FIG. 7. Note that the Applicant of the present invention has proposed a method and apparatus for transmitting device configuration data from transmission units in Japanese Patent Application No. 10-52475 (1998).

Figure 7:
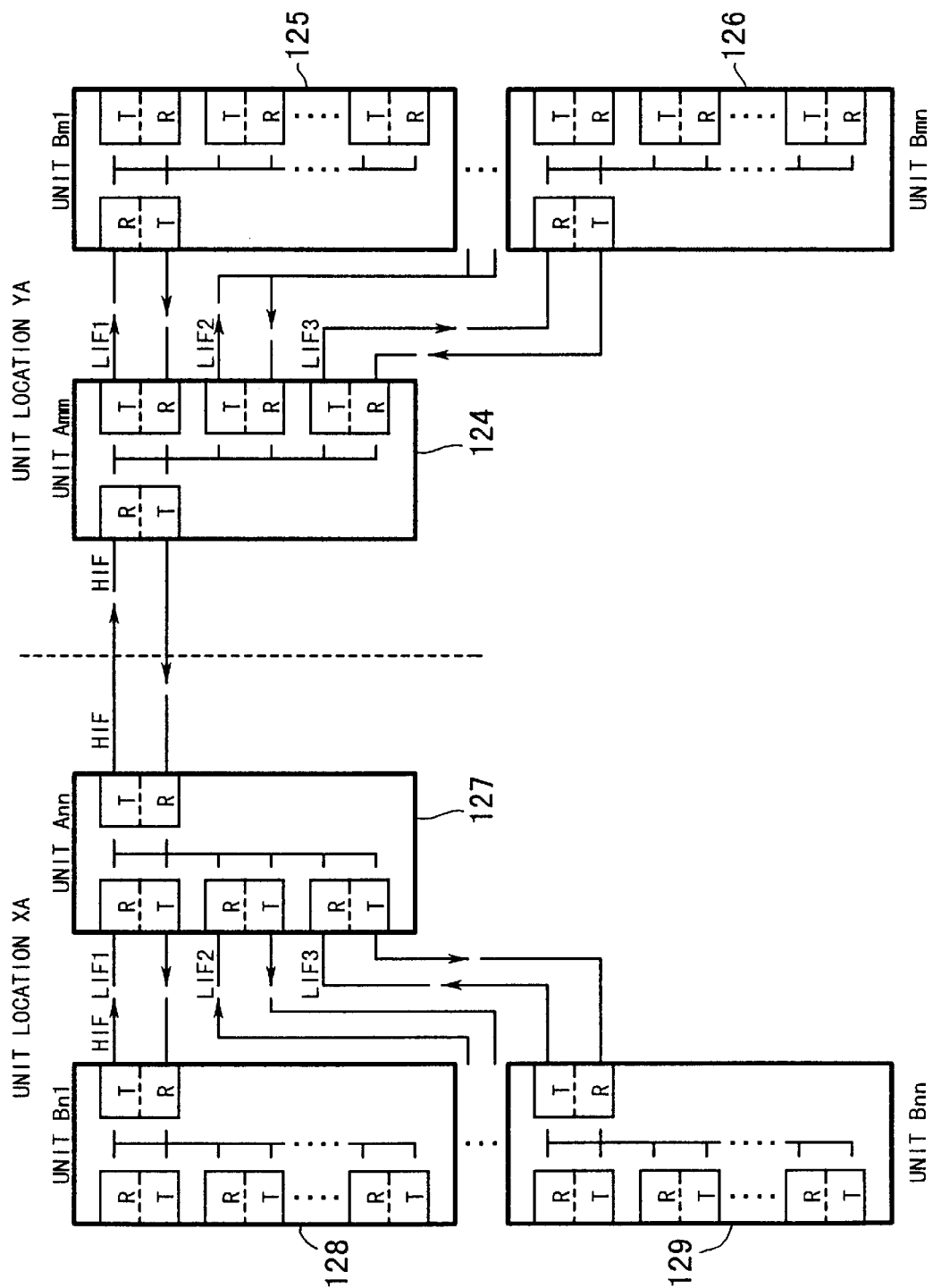
FIG. 7 is a diagram which depicts two transmission units placed at remote locations, particularly showing how their interface modules are connected with each other.

FIG. 7 shows the arrangement of interface modules of the transmission units 124 to 126 at the location YA and of the transmission units 127 to 129 at the location XA. FIG. 7 also illustrates how the interface modules are interconnected. Consider here that the transmission units 124, 125, and 126 have unit identifiers Amm, Bm1, and Bmn, respectively, and that the transmission units 127, 128, and 129 have unit identifiers Ann, Bn1, and Bnn. In FIG. 7, the interface modules serving as transmitters signals are labeled "T," while those serving as receivers are labeled "R." Further, in FIG. 7, the symbols "HIF" and "LIF" attached to several interface modules denote that those modules are high-level interfaces (i.e., high-speed signal interfaces) and low-level interfaces (i.e., low-speed signal interfaces), respectively.

Based on the connections between interface modules illustrated in FIG. 7, the following device configuration data is transmitted from the transmission unit 127 to the network configuration database builder 10, conveying information on its high-level interface module.

Remote Interface Identification Data Set
   including:
      Unit Location "YA,"
      Unit Type "NNNN,"
      Unit ID "Amm,"
      Rack ID "99,"
      System Module Slot ID "99,"
      Interface Slot ID "99," and
      Interface Type "HIF"

Local Interface Identification Data Set
   including:
      Unit Location "XA,"
      Unit Type "NNNN,"
      Unit ID "Ann,"
      Rack ID "99,"
      System Module Slot ID "99,"
      Interface Slot ID "99," and
      Interface Type "HIF,"

where the Rack IDs are the identification numbers of the racks 151 to 153 illustrated in FIG. 5(B), the System Module Slot IDs are identification numbers of the system module slots 151a and 151b illustrated in FIG. 5(B), and the Interface Slot IDs are slot numbers assigned to the interface module slots 152a and 153b illustrated in FIG. 5(B).

Similarly to the above, the following device configuration data is transmitted from the transmission unit 124 to the network configuration database builder 10, conveying information on its high-level interface module.

Remote Interface Identification Data Set
   including:
      Unit Location "XA,"
      Unit Type "NNNN,"
      Unit ID "Ann,"
      Rack ID "99,"
      System Module Slot ID "99,"
      Interface Slot ID "99," and
      Interface Type "HIF"

Local Interface Identification Data Set
   including:
      Unit Location "YA,"
      Unit Type "NNNN,"
      Unit ID "Amm,"
      Rack ID "99,"
      System Module Slot ID "99,"
      Interface Slot ID "99," and
      Interface Type "HIF"

Furthermore, the following device configuration data is transmitted from the transmission unit 128 to the network configuration database builder 10, conveying information on its high-level interface module.

Remote Interface Identification Data Set
   including:
      Unit Location "XA,"
      Unit Type "NNNN,"
      Unit ID "Ann,"
      Rack ID "99,"
      System Module Slot ID "99,"
      Interface Slot ID "99," and
      Interface Type "LIF1"

Local Interface Identification Data Set
   including:
      Unit Location "XA,"
      Unit Type "NNNN,"
      Unit ID "Bn1,"
      Rack ID "99,"
      System Module Slot ID "99,"
      Interface Slot ID "99," and
      Interface Type "HIF"

As the above examples illustrate, the device configuration data generally consists of a remote interface identification data set and a local interface identification data set.

Figure 8:
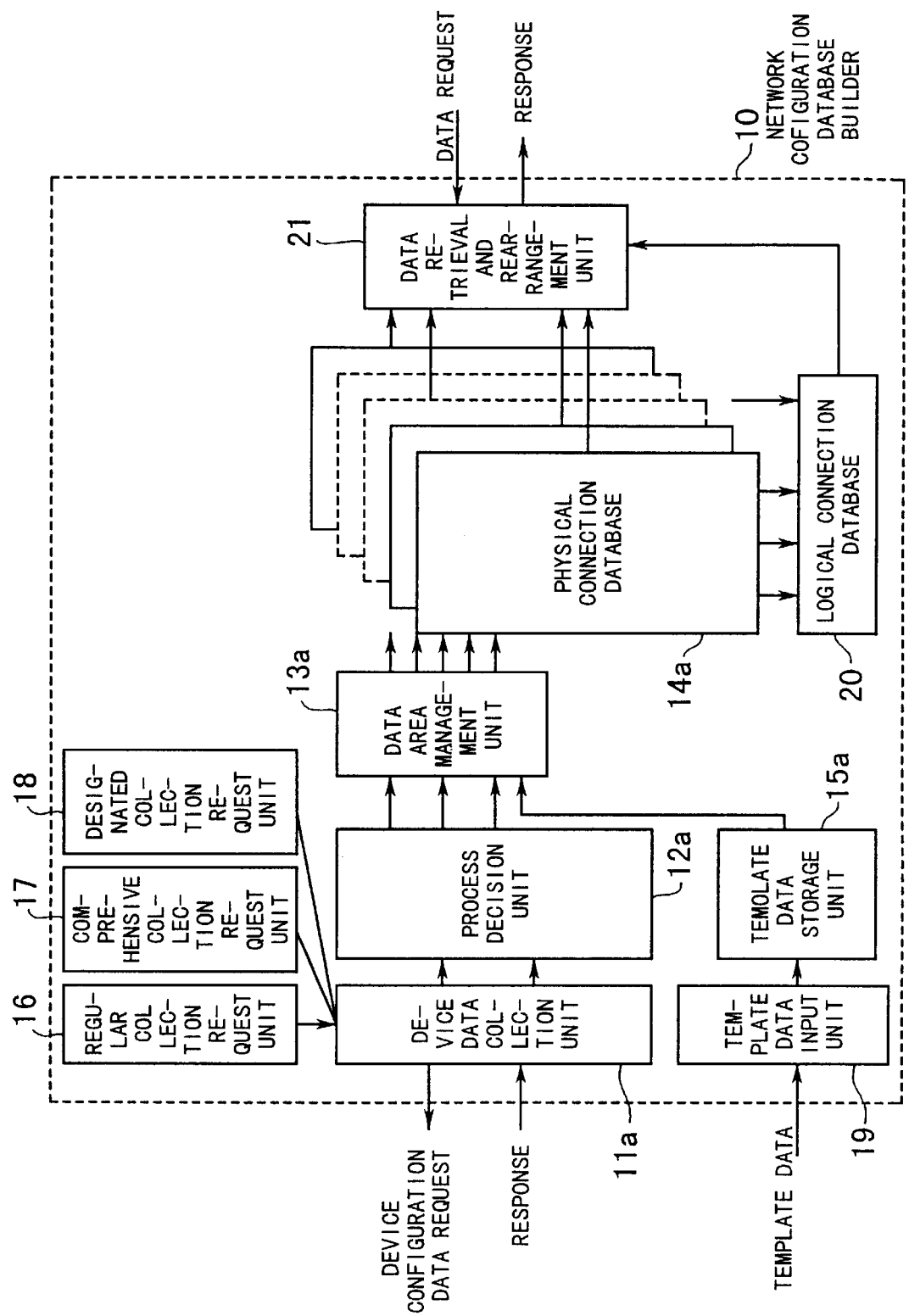
FIG. 8 is a diagram which shows the internal structure of a network configuration database builder according to the present invention.

FIG. 8 presents the internal structure of the network configuration database builder 10. While not illustrated in the accompanying drawings, a data processing unit comprising a CPU, RAM, ROM, I/O interfaces, and other components is a suitable platform for the network configuration database builder 10. All the blocks included in the network configuration database builder 10 of FIG. 8 are implemented as hardware and software functions of such a data processing unit.

In operation of the network configuration database builder 10 of FIG. 8, a regular collection request unit 16 requests, at regular intervals, the device data collection unit 11a to initiate a process of collecting device configuration data from all transmission units being available. In contrast to this, a comprehensive collection request unit 17 requests the device data collection unit 11a to initiate a like process in response to a demand from external sources such as network administrators or other processing equipment. As the name implies, the comprehensive collection request unit 17 invokes a data collection process that will spread across the entire network, thus rebuilding the network configuration database. A designated collection request unit 18, on the other hand, requests the device data collection unit 11a to perform a data collection process only for a specific transmission unit. The device data collection unit 11a responds to those requests by collecting device configuration data from the transmission unit concerned. The collected data is then sent to a process decision unit 12a.

The device data collection unit 11a has buffer storage to keep the data collected in the preceding cycle. When processing a data collection request from the regular collection request unit 16, the device data collection unit 11a uses this buffer storage to extract difference information between the past data and the new data. As a result, the process decision unit 12a receives only the difference information.

Examining the Unit Location, Unit Type, and Unit ID fields of the received device configuration data, the process decision unit 12a determines what kind of data management process should be performed. More specifically, the process decision unit 12a chooses and executes a process of adding a new record, updating an existing record, or setting up a new data storage area, depending on the content of the received data. Here, the data adding process is executed when a new interface module is added to a transmission unit. The data updating process is called up when an existing interface module was changed to another one. The new area set-up process is executed when a new transmission unit was added to the network and another data storage area has become necessary.

On the other hand, an external source supplies a template data input unit 19 with template data that has been prepared for each different unit type. The template data input unit 19 saves the received template data into a template data storage unit 15a. The details of this template data will be discussed later.

The decision made by the process decision unit 12 is then passed to a data area management unit 13a as a process execution command. The data area management unit 13a saves the received device configuration data into a relevant part of the physical connection database 14. When the received process execution command requires allocation of a new data storage area, the data area management unit 13a searches for an appropriate set of template data stored in the template data storage unit 15a by using the given field values of Unit Location, Unit Type, and Unit ID as search keywords. Based on the template data found by this search, it reserves a new data storage area in the physical connection database 14a for storing a new set of device configuration data. The data area management unit 13a is designed to execute the same process when initially setting up the network management database.

In the way described above, the physical connection database 14a has a plurality of data storage areas that are configured on the basis of appropriate template data. These data storage areas are uniquely associated with the individual unit locations, and the device configuration data gathered in a particular unit location is transferred to a relevant part of a data storage area that corresponds to that particular unit location. As a result of this data storage method, the device configuration data stored in each data storage area of the physical connection database 14a will have a specific data structure derived from the template data.

Based on the device configuration data in the physical connection database 14a, a logical connection database 20 creates and stores logical connection data that shows network connections at each hierarchical level. A data retrieval and rearrangement unit 21 reads out information from the physical connection database 14a and logical connection database 20 in response to a request from external entities. It then rearranges the information and outputs it to the requesting entities.

Figure 9:
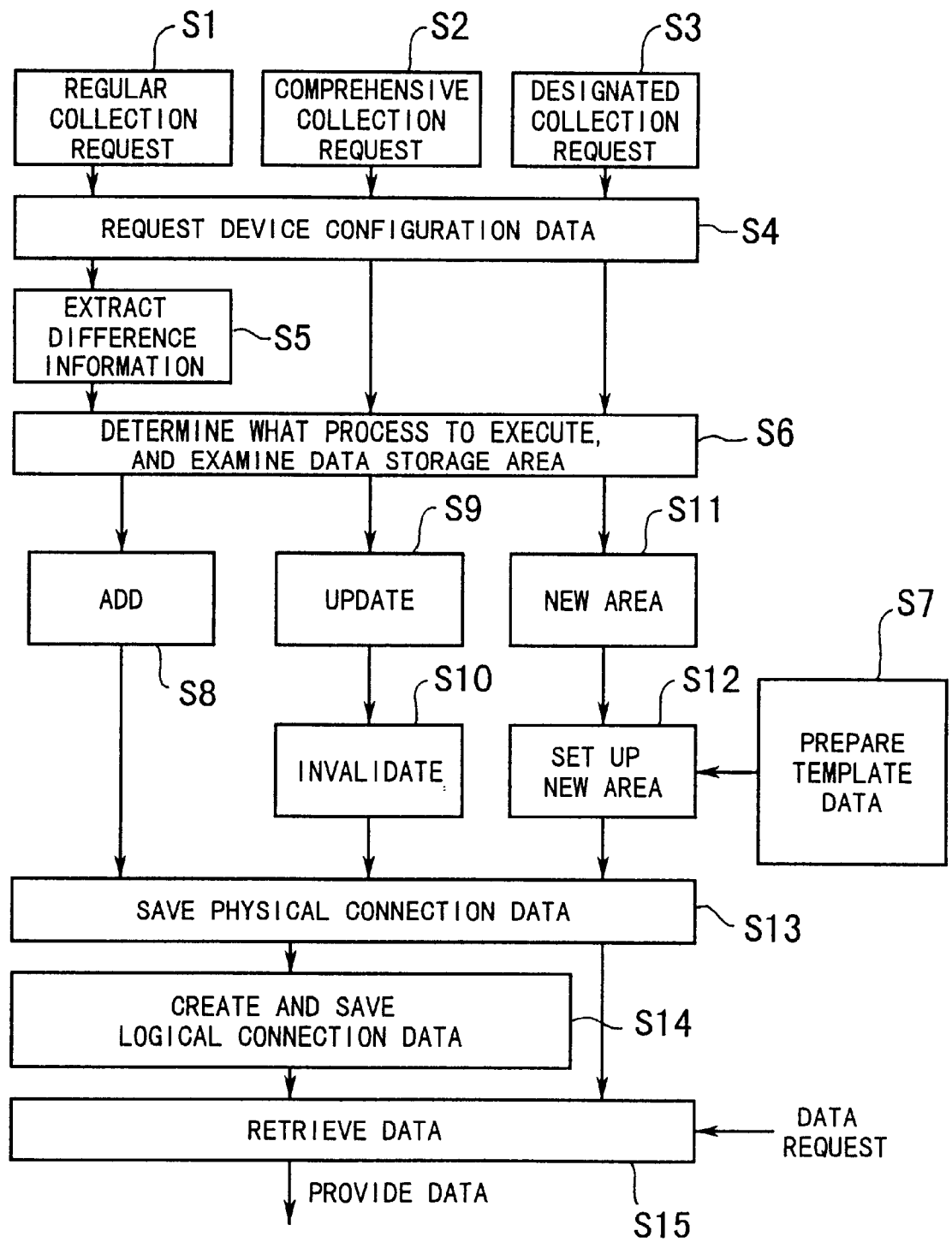
FIG. 9 is a flowchart showing a process executed by the network configuration database builder.

FIG. 9 is a flowchart showing a process executed by the network configuration database builder 10 of FIG. 8. The following section describes the details of this process, citing the step numbers (S1 to S15) shown in FIG. 9 for reference.

The regular collection request unit 16 requests, at regular intervals, the device data collection unit 11a to initiate a data collection process for all transmission units (Step S1). The comprehensive collection request unit 17 requests the device data collection unit 11a to initiate a data collection process for all transmission units, in response to a demand from external sources such as network administrators or other processing equipment being connected (Step S2). The designated collection request unit 18 requests the device data collection unit 11a to initiate a data collection process for a particular transmission unit that is specified explicitly (Step S3). In response to those requests, the device data collection unit 11a collects device configuration data from the transmission unit(s) concerned (Step S4).

Consider, for example, that the present requester is the regular collection request unit 16. The device data collection unit 11a then extracts the difference between the stored configuration data and newly collected data, and supplies the process decision unit 12a with this difference information (Step S5). In the case of other two requesters, the device data collection unit 11a simply transfers the collected data to the process decision unit 12a. The process decision unit 12a then examines the Unit Location, Unit Type, and Unit ID fields of the received device configuration data to determine what kind of data management process should be performed; that is, it chooses a process of adding a new record, updating an existing record, or reserving a new data storage area, depending on the content of received data (Step S6).

The template data input unit 19, on the other hand, receives template data from an external source. This template data has been prepared for each different unit type, and the template data input unit 19 saves it into the template data storage unit 15a (Step S7). Digressing from the flowchart of FIG. 9, and referring now to FIGS. 10 to 13, the following few paragraphs will be devoted to the details of template data.

Figure 10:
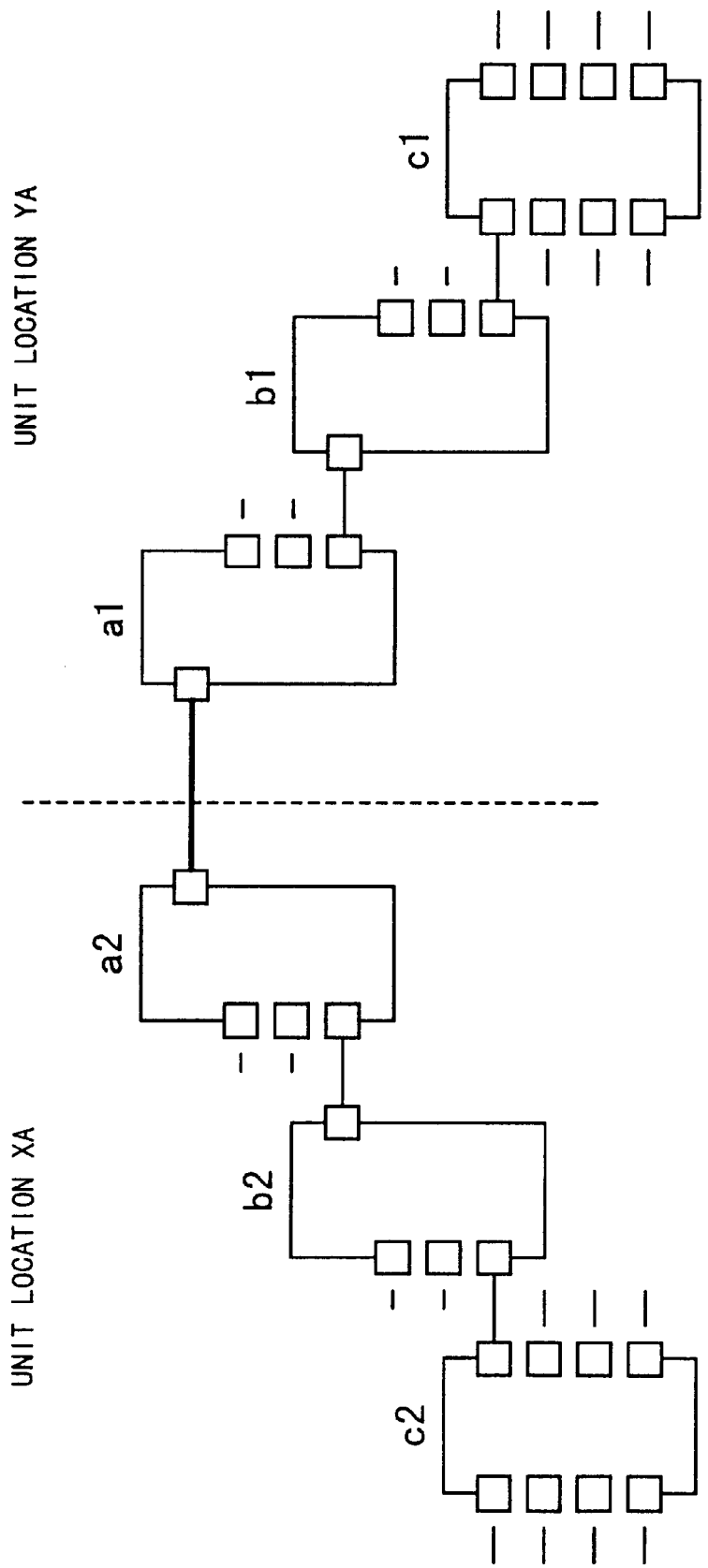
FIG. 10 is a diagram which explains hierarchical relationships among transmission units by illustrating two transmission units at remote locations.

FIG. 10 explains hierarchical relationships among transmission units by illustrating two transmission units at remote locations. This example assumes that three transmission units a1, b1, and c1 are placed at a location YA, while other three transmission units a2, b2, and c2 are placed at a location XA. The transmission units a1, b1, a2, and b2 are multiplexer/demultiplexer devices, and the transmission units c1 and c2 are path/channel rearrangement devices. At the location YA, the transmission units a1 and b1 are connected in series, and the transmission unit c1 follows after the transmission unit b1. Likewise, the transmission units a2, b2, and c2 at the location XA are cascaded in this order. Further, the transmission units a1 and a2 are linked to each other. The illustrated unit connections form a hierarchical structure in terms of signal multiplexing. That is, the transmission units a1 and a2 are considered to be at equal hierarchical levels, as are the transmission units b1 and b2.

The above hierarchical structure of transmission units allows the relationships between local interface modules and remote interface modules to be classified according to their respective levels in the hierarchy. With this classification, the template data for multiplexer/demultiplexer devices is formulated as a general model to describe the relationships between interface modules. Concerning path/channel rearrangement devices, their template data serves as a generic model to describe how their switch modules are configured, as well as to describe how their interface modules are linked to those of other transmission units. More specifically, the template data provides a way to describe the cross-connections among signal terminals of a switch module by using terminal identifiers that are assigned in accordance with a predetermined numbering rule (or ordering rule for data management).

Figure 11:
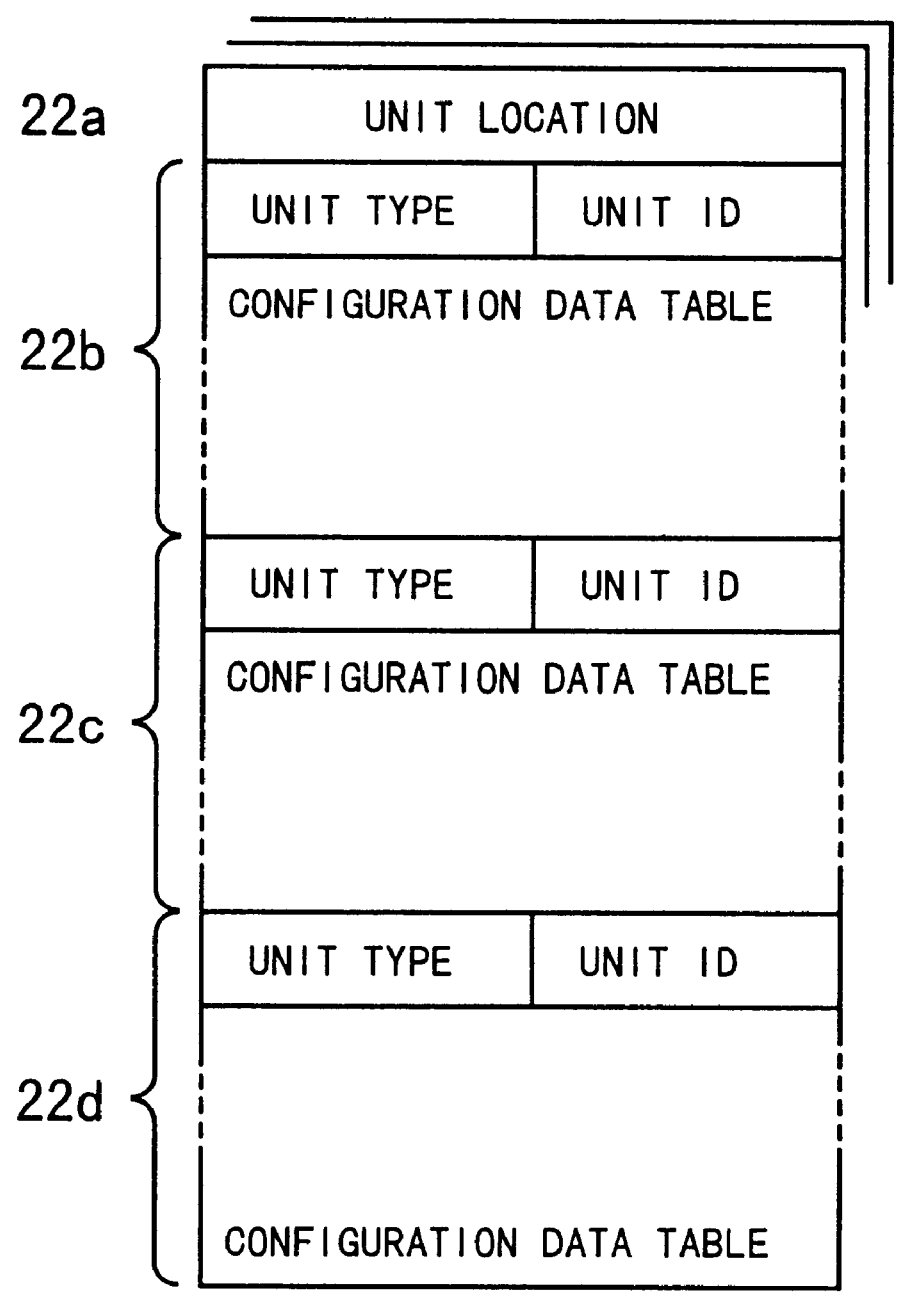
FIG. 11 is a diagram which shows data storage areas reserved on a physical connection database.

When initially setting up the system, the data area management unit 13a reserves required data storage areas on the physical connection database 14a with reference to the template data described above. Referring next to FIGS. 11 to 13, the following few paragraphs will focus on this data storage area.

FIG. 11 shows data storage areas developed on the physical connection database 14a. That is, separate data storage areas are allocated to different unit locations, and the area for one unit location consists of a "Unit Location" field 22a and a plurality of "Transmission Unit Data" fields 22b, 22c, and 22d. Each Transmission Unit Data field has a "Unit Type" field, a "Unit ID" field, and a "Configuration Data Table." These fields will be filled with the corresponding data items that are found in the device configuration data received from a transmission unit. More specifically, the unit location ID is transferred to the Unit Location field 22a, the unit type and unit ID are put into the Unit Type and Unit ID fields, respectively. Regarding the Configuration Data Table, its structure will be described in detail below, with reference to FIGS. 12(A), 12(B), and 13.

FIGS. 12(A), 12(B), and 13 present a few examples of detailed internal data structure of Configuration Data Tables. More specifically, FIG. 12(A) shows a first example of the table, which is applicable when the transmission unit of interest is classified as a multiplexer/demultiplexer device, while FIG. 12(B) depicts a second example of the same. On the other hand, FIG. 13 presents an exemplary internal structure of the Configuration Data Table when the transmission unit of interest falls under the category of path/channel rearrangement devices.

In FIGS. 12(A) and 12(B), the table consists of a plurality of entries corresponding to individual interface modules. Each entry starts with a field named "Level," which indicates whether the interface module is used as an upper-level interface or a lower-level interface in terms of the aforementioned multilevel hierarchy. This field is determined by the Interface Type field of device configuration data, which may have a value of "HIF" or "LIF." More specifically, the "HIF" will set the Level field to "U" that represents an upper level, and the "LIF" will set it to "D" that represents a lower level. The latter value "D" is actually followed by serial numbers, such as "D1," "D2," "D3," and so on, because there are a plurality of lower-level interfaces and it is necessary to distinguish them from each other.

The second data field, "Redundancy," indicates whether the interface module of interest is an active modules or backup module. This field is valid only when the interface is configured to have dual redundancy, in which case the Redundancy field will have a value of "0" for active modules and "1" for backup modules. The second example of FIG. 12(B) shows that one interface module labeled "ST" in the Level field is installed as a common backup module for seven lower-level interface modules D1 to D7.

Both tables shown in FIGS. 12(A) and 12(B) have two more data fields titled "Remote Interface Location Data" and "Local Interface Location Data." The Remote Interface Location Data field actually contains the following field values: "Unit Location," "Unit Type," "Unit ID," "Rack ID," "System Module Slot ID, and "Interface Slot ID." All these values are extracted from the first half of received device configuration data, or the "Remote Interface Identification Data Set." The Local Interface Location Data field, on the other hand, contains the field values of "Rack ID," "System Module Slot ID, and "Interface Slot ID," which are extracted from the second half of the received device configuration data, or the "Local Interface Identification Data Set."

Referring to FIG. 13, the Configuration Data Table for path/channel rearrangement devices consists of a plurality of entries corresponding to individual interface modules installed in a transmission unit. Unlike the tables for multiplexer/demultiplexer devices, each entry has two data fields named "TSW" and "SSW" to describe the signal terminals of time and space switches associated with the interface module of interest. The Level field exists, but it is not used. The Redundancy field may or may not be used in the same way as that in FIGS. 12(A) and 12(B). The Remote Interface Location Data field contains the field values of "Unit Location," "Unit Type," "Unit ID," "Rack ID," "System Module Slot ID, and "Interface Slot ID" extracted from the Remote Interface Identification Data Set, as part of the received device configuration data. The Local Interface Location Data field, on the other hand, contains the field values of "Rack ID," "System Module Slot ID, and "Interface Slot ID" extracted from the Local Interface Identification Data Set, as part of the received device configuration data.

By using terminal IDs, which are defined in accordance with a prescribed ordering rule for data management, the next "TSW (Time Switch)" field describes how the time switches are configured to make the present cross-connections. Likewise, the "SSW (Space Switch)" field describes how the space switches are configured, by using terminal IDs defined in accordance with a prescribed ordering rule for data management. Recall here that several examples of device configuration data were presented in earlier sections of this description. Because their focus was limited to the device configuration data of multiplexer/demultiplexer devices, no information for TSW and SSW fields was mentioned in those examples. Such information, however, must be included in the configuration data collected from path/channel rearrangement devices.

The data storage area for the above Configuration Data Table allows for the maximum number of interface modules and switch terminals. Each data storage area is fixed in size, but large enough to cope with any variations in the types and combinations of interface and switch modules.

The discussion now returns to the flowchart of FIG. 9. As described earlier, the decision in Step S6 may result in either of the following three processes.

First, when a new interface module has been added to a transmission unit, the process decision unit 12a chooses a process of storing an additional record (Step S8). It saves the device configuration data of that new interface module into the data storage area (Step S13). Here, it is guaranteed that the process decision unit 12a can find a vacancy, since the data storage area is reserved for a maximum possible configuration.

Second, the process decision unit 12a may choose a process of updating existing records (Step S9). This choice will be made when it is found that the received device configuration data describes an interface module that is different from what the corresponding database record indicates. This means that the interface module has been changed. In this case, the process decision unit 12 first deletes the existing device configuration data for the original interface module by overwriting an invalidation code (e.g., "FFFF" in hexadecimal) to the relevant part of the physical connection database 14a (Step S10). After that, the process decision unit 12a updates the physical connection database 14a by storing a record for the new interface module (Step S13).

Third, the process decision unit 12a may choose a process of creating a new data storage area. This choice will occur when a new transmission unit is added to the network system. The process decision unit 12a can detect it by finding a new Unit ID being included in the received device configuration data. Upon detection, the data area management unit 13a searches the template data storage unit 15a by using the Unit Location, Unit Type, and Unit ID field values as search keywords. Based on the template data found in this search, it allocates memory resources to a new data storage area in the physical connection database 14a for storing a new set of device configuration data (Step S12). After that, the process decision unit 12a saves the received device configuration data of that new transmission unit into the newly created data storage area (Step S13).

In this way, the device configuration data is collected from each transmission unit and stored in the data storage area that has been previously reserved on the basis of appropriate template data. As a result of this data storage method, the device configuration data stored in the physical connection database 14a will have a prescribed format as defined by the template data. Now that the device configuration data is ready in the physical connection database 14a, the logical connection database 20 arranges and stores logical connection data that indicates network connections at each hierarchical level (Step S14).

Figure 14:
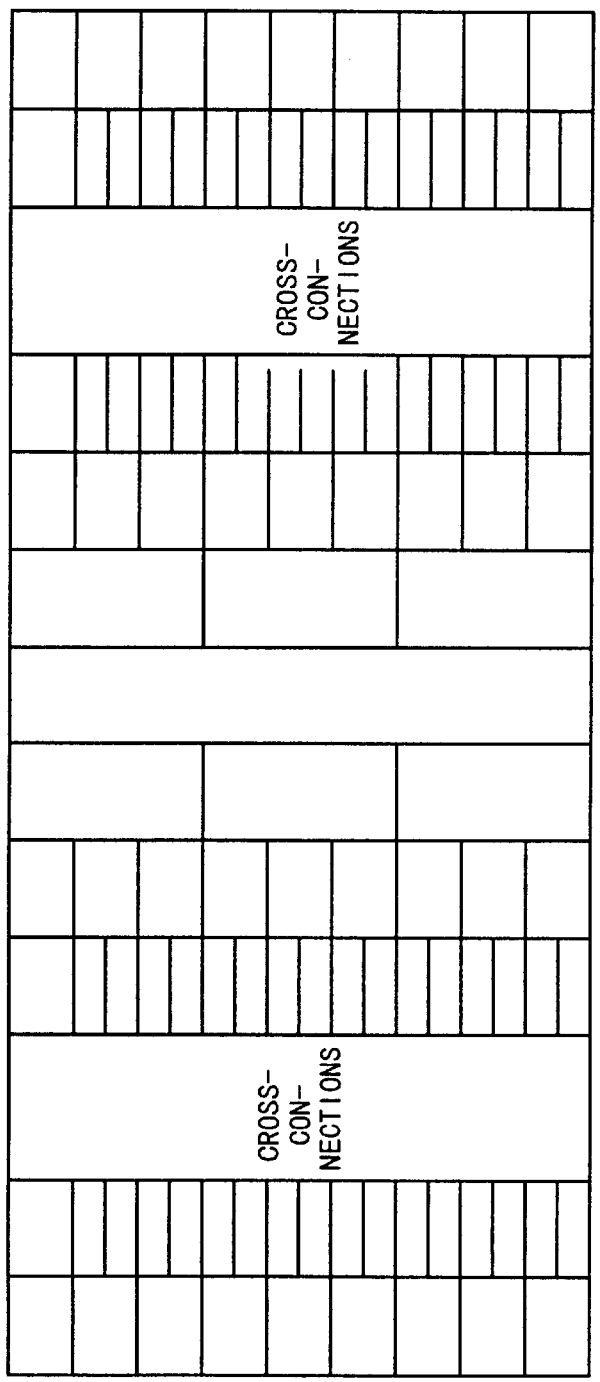
FIG. 14(A) is a diagram which shows a logical connection data stored in a logical connection database.
FIG. 14(B) is a diagram which shows an arrangement of the transmission units shown in FIG. 10, in association with the logical connection data of FIG. 14(A)
FIG. 14(C) is a diagram which shows connection paths established between transmission units shown in FIG. 10 at equal hierarchical levels.

FIGS. 14(A) to 14(C) explain the concept of this logical connection data. More specifically, FIG. 14(A) shows the structure of logical connection data stored in a logical connection database. FIG. 14(B) shows an arrangement of the transmission units shown in FIG. 10. FIG. 14(C) shows some connection paths between transmission units shown in FIG. 10, which are established at each hierarchical level.

Recall that each record of device configuration data stored in the physical connection database 14a consists of the following two sections: "Remote Interface Location Data" and "Local Interface Location Data." Concerning any pair of transmission units being directly interconnected, these two data sections have a symmetrical nature. Suppose, for example, that a first interface module in a first transmission unit is linked to a second interface module in a second transmission unit. In this situation, the Local Interface Location Data of the first interface module coincides with the Remote Interface Location Data of the second interface module. Also, the Local Interface Location Data of the second interface module coincides with the Remote Interface Location Data of the first interface module.

FIG. 14(A) shows the structure of logical connection data for the transmission units a1, b1, c1, a2, b2, and c2 shown in FIG. 10, which are constituent units of two adjacent nodes in the network. This logical connection data is formulated by using this relationship between two directly linked interface modules. More specifically, the relevant records of device configuration data are read out of the physical connection database 14a, and then rearranged by tracing the Remote and Local Interface Location Data that are common to two interface modules being directly linked. As a result of this rearrangement, five sets of common interface location data are found at the boundaries of six transmission units a1, b1, c1, a2, b2, and c2 represented by broken lines in FIG. 14(B). FIG. 14(A) shows such common interface location data I10, I21, I22, I31, and I32 at the transmission unit boundaries. This logical connection data of FIG. 14(A) permits the network engineers to find the origins and destinations of existing connection paths, such as P1, P2, P3, and P4 illustrated in FIG. 14(C), each of which interconnects two network entities at equal hierarchical levels. The logical connection data also helps the network engineers to identify the intermediary structure of those connection paths.

Referring back to the flowchart of FIG. 9, the data retrieval and rearrangement unit 21 reads out records from the physical connection database 14a and logical connection database 20 in response to requests from external entities. It then rearranges them and outputs the result to the requesting entities (Step S15). For example, the data retrieval and rearrangement unit 21 extracts and rearranges the data related to unused paths or channels that may exist within a given segment of the network. The resultant data is then output as installation design information. As another example, when setting up network paths and channels, one should prepare necessary information about the network configuration, including: how the path/channel rearrangement devices are linked, how they are connected to subscriber terminals, how the switch module in each path/channel rearrangement device is configured to provide cross-connections, and which signal terminals are available. However, it is also true that there is unnecessary information, such as high-level path information. The data retrieval and rearrangement unit 21 offers necessary and sufficient information for setting up the network.

The data retrieval and rearrangement unit 21 has a capability to produce useful data for a network verification test, which helps the network engineer to designate specific connection paths between network devices at equal hierarchical levels. Further, the data retrieval and rearrangement unit 21 aids troubleshooting by offering such information that indicates which transmission units and what part of the transmission units are related to a faulty path. To locate a problem reported, the network engineers need to know how the network connections are configured both physically and logically. The data retrieval and rearrangement unit 21 offers necessary and sufficient information for their troubleshooting activities.

The embodiment of the present invention has been illustrated by taking multiplexer/demultiplexer devices and path/channel rearrangement devices for example. However, the application of the present invention is not limited to these two types of transmission units, but can be extended to other kinds of units, including controller apparatus for transmission units. With respect to the number of hierarchical levels, the present invention is not limited to the specific example discussed above, where the transmission units form a three-layer structure.

Now, the present invention will be summarized as follows. According to the present invention, the network configuration database builder automatically collects configuration data from network devices and creates and stores network configuration data into a physical connection database. The network configuration database is automatically constructed in accordance with prescribed data models, or templates, reflecting possible variations in the configuration of transmission units.

These features of the present invention will relieve the network engineers of an enormous amount of work to create a network configuration database. This also prevents human errors from being introduced in the process of building a database, thus eliminating the time and labor costs related to the manual data collection and verification tasks.

The network configuration database of the present invention stores data records in a hierarchical manner. This facilitates database search operations for a specific connection between a high-level interface module of a transmission unit and a low-level interface module of another transmission unit linked to it, as well as for a connection between transmission units in different network nodes.

Furthermore, the network configuration database builder of the present invention finds and traces the links of interface modules to produce logical connection data on the basis of the records of device configuration data in the physical connection database. This logical connection data, which represents logical connections between two adjacent nodes at each hierarchical level, will provide useful information for the network engineers to achieve their daily tasks, such as circuit installation and network verification tests. When a specific level is given, the present invention provides information on the configuration of low-level transmission units and transmission channels being involved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for building a network configuration database, which is connected to a plurality of transmission units constituting a network, said apparatus comprising:

device data collection means for collecting device configuration data from the plurality of transmission units, the device configuration data describing how each transmission unit is internally configured and how each transmission unit is linked to other transmission units;

template data storage means for storing template data that is previously prepared by modeling possible configurations of various types of transmission units;

physical connection data storage means for storing the device configuration data;

data area management means for reserving a plurality of data storage areas in said physical connection data storage means according to the template data stored in said template data storage means, said plurality of data storage areas being allocated respectively to the plurality of transmission units; and process decision means for saving the device configuration data collected by said device data collection means into the corresponding data storage areas in said physical connection data storage means.

2. The apparatus according to claim 1, wherein:

the plurality of transmission units include first and second transmission units, and a first interface module installed in the first transmission unit is linked to a second interface module installed in the second transmission unit; and the device configuration data of the first interface module comprises a first identification data set that identifies the first interface module and a second identification data set that identifies the second interface module.

3. The apparatus according to claim 2, wherein:

said first identification data set contains:
  (a1) unit location, unit type, and identification number of the first transmission unit,
  (a2) identification numbers of constituents of the first transmission unit, and
  (a3) identification number and hierarchical level of the first interface module; and said second identification data set contains:
  (b1) unit location, unit type, and identification number of the second transmission unit,
  (b2) identification numbers of constituents of the second transmission unit, and
  (b3) identification number and hierarchical level of the second interface module.

4. The apparatus according to claim 1, wherein:

the plurality of transmission units include a first transmission unit that falls under a category of multiplexer/demultiplexer devices;

the template data provides for a plurality of data entries to describe a plurality of interface modules installed in the first transmission unit; and the data entry for a first interface module in the first transmission unit comprises:
  (a) a first data field for storing information that indicates a hierarchical level of the first interface module,
  (b) a second data field for storing information that indicates whether the first interface module has redundancy,
  (c) a third data field for storing a first identification data set that identifies the first interface module, and
  (d) a fourth data field for storing a second identification data set that identifies a second interface module installed in a second transmission unit that is linked to the first interface module.

5. The apparatus according to claim 1, wherein:

the plurality of transmission units include a first transmission unit that falls under a category of path/channel rearrangement devices;

the template data provides for a plurality of data entries to describe cross-connections associated with a plurality of interface modules installed in the first transmission unit; and the data entry for a first interface module installed in the first transmission unit comprises:
  (a) a first data field for storing a first identification data set that identifies the first interface module,
  (b) a second data field for storing a second identification data set that identifies a second interface module installed in a second transmission unit that is linked to the first interface module, and
  (c) a third data field for storing information that describes cross-connections being made within a switch module of the first transmission unit.

6. The apparatus according to claim 1, wherein said process decision unit comprises:

new data area setting means for setting up a new data storage area in said physical connection data storage means by activating said data area management means, when a unit identifier of a new transmission unit is found in the device configuration data collected by said device data collection means; and data saving means for saving the device configuration data containing the unit identifier of the new transmission unit into a relevant part of the new data storage area that has been set up by said new data area setting means and said data area management means.

7. The apparatus according to claim 1, wherein said process decision means comprises:

data deleting means for deleting the device configuration data of a first interface module which exists in one of the data storage areas in said physical connection data storage means, when a second interface module is identified, instead of the first interface module, in a set of device configuration data newly collected by said device data collection means; and data saving means for saving the device configuration data of the second interface module into said one of the data storage areas in said physical connection data storage means, after said data deleting means has completed the deletion.

8. The apparatus according to claim 1, further comprising logical connection data storage means for creating logical connection data by rearranging the device configuration data read out of said physical connection data storage means, and storing the logical connection data created.

9. The apparatus according to claim 8, further comprising data retrieval and rearrangement means, responsive to a data request from an external source, for retrieving the device configuration data from said physical connection data storage means and the logical connection data from said logical connection data storage means, rearranging the retrieved data as requested, and outputting the resultant data as a response to the data request.

10. The apparatus according to claim 9, wherein said data retrieval and rearrangement means comprises installation design data producing means for producing installation design data that describes unused paths and/or unused channels.

11. The apparatus according to claim 9, wherein said data retrieval and rearrangement means comprises verification test data producing means for producing data for use in a network verification test, which aids a user in selecting a specific connection path between network devices at equal hierarchical levels.

12. The apparatus according to claim 9, wherein said data retrieval and rearrangement means comprises fault data producing means for producing data that indicates which transmission units and/or what part of the transmission units are related to a faulty path.

13. A method of building a network configuration database, which is executed by a network configuration database builder that is connected to a plurality of transmission units constituting a network and comprises a physical connection database to store device configuration data, said method comprising the steps of:

(a) storing template data that is previously prepared by modeling possible configurations of various types of transmission units;

(b) reserving a plurality of data storage areas in the physical connection database according to the template data stored in said step (a);

(c) collecting device configuration data from the plurality of transmission units, which describes how each transmission unit is internally configured and how each transmission unit is linked to other transmission units; and (d) storing the device configuration data collected in said step (c) into the corresponding data storage areas reserved in the physical connection database.

14. The method according to claim 13, wherein:

the plurality of transmission units include first and second transmission units, and a first interface module installed in the first transmission unit is linked to a second interface module installed in the second transmission unit; and the device configuration data of the first interface module comprises a first identification data set that identifies the first interface module, and a second identification data set that identifies the second interface module.

15. The method according to claim 14, wherein said first identification data set contains:
 (x1) unit location, unit type, and identification number of the first transmission unit,
 (x2) identification numbers of constituents of the first transmission unit, and
 (x3) identification number and hierarchical level of the first interface module, and said second identification data set contains:
 (y1) unit location, unit type, and identification number of the second transmission unit,
 (y2) identification numbers of constituents of the second transmission unit, and
 (y3) identification number and hierarchical level of the second interface module.

16. The method according to claim 13, wherein:

the plurality of transmission units include a first transmission unit that falls under a category of multiplexer/demultiplexer devices;

the template data provides for a plurality of data entries to describe a plurality of interface modules installed in the first transmission unit; and the data entry for a first interface module in the first transmission unit comprises:
 (x1) a first data field for storing information that indicates a hierarchical level of the first interface module,
 (x2) a second data field for storing information that indicates whether the first interface module has redundancy,
 (x3) a third data field for storing a first identification data set that identifies the first interface module, and
 (x4) a fourth data field for storing a second identification data set that identifies a second interface module installed in a second transmission unit that is linked to the first interface module.

17. The method according to claim 13, wherein:

the plurality of transmission units include a first transmission unit that falls under a category of path/channel rearrangement devices;

the template data provides for a plurality of data entries to describe cross-connections associated with a plurality of interface modules installed in the first transmission unit; and the data entry for a first interface module installed in the first transmission unit comprises:
 (x1) a first data field for storing a first identification data set that identifies the first interface module,
 (x2) a second data field for storing a second identification data set that identifies a second interface module installed in a second transmission unit that is linked to the first interface module, and
 (x3) a third data field for storing information that describes cross-connections being made within a switch module of the first transmission unit.

18. The method according to claim 13, wherein said step (d) comprises the substeps of:
 (d1) setting up a new data storage area in the physical connection database, according to the template data stored in said step (a), when a unit identifier of a new transmission unit is found in the device configuration data collected in said step (c); and
 (d2) saving the device configuration data containing the unit identifier of the new transmission unit into a relevant part of the new data storage area that has been set up in said substep (d1).

19. The method according to claim 13, wherein said step (d) comprises the substeps of:

(d1) deleting the device configuration data of a first interface module that exists in the data storage areas in the physical connection database, when a second interface module is identified, instead of the first interface module, in the device configuration data collected in said step (c); and (d2) saving the device configuration data of the second interface module into the data storage areas in the physical connection database, after said step (d1) of deleting is executed.

20. The method according to claim 13, wherein:

the network configuration database builder has a logical connection database; and the method further comprises the step of (e) creating logical connection data by rearranging the device configuration data read out of the physical connection database, and storing the created logical connection data into the logical connection database.

21. The method according to claim 20, further comprising the step of (f) retrieving the device configuration data from the physical connection database and the logical connection data from the logical connection database in response to a data request from an external source, rearranging the retrieved data as requested, and outputting the resultant data as a response to the data request.

22. The method according to claim 21, wherein said step (f) comprises the substep of (f1) producing installation design data that describes unused paths and/or unused channels.

23. The method according to claim 21, wherein said step (f) comprises the substep of (f1) producing data for use in a network verification test, which aids a user in selecting a specific connection path between network devices at equal hierarchical levels.

24. The method according to claim 21, wherein said step (f) comprises the substep of (f1) producing data that indicates which transmission units and/or what part of the transmission units are related to a faulty path.

* * * * *